(12) United States Patent  
Groenendaal et al.

(10) Patent No.: US 8,667,110 B2  
(45) Date of Patent: Mar. 4, 2014

(54) METHOD AND APPARATUS FOR PROVIDING A REMOTELY MANAGED EXPANDABLE COMPUTER SYSTEM

(75) Inventors: Johan van de Groenendaal, Portland, OR (US); Matthew Adiletta, Bolton, MA (US); Myles Wilde, Charlestown, MA (US); Michael Fallon, Tiverton, RI (US); Aaron Gorius, Upton, MA (US); William Wheeler, Southborough, MA (US); Chengda Yang, Auburndale, MA (US); Paul Dormitzer, Acton, MA (US); Douglas Carrigan, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 497 days.

(21) Appl. No.: 12/655,015

(22) Filed: Dec. 22, 2009

(65) Prior Publication Data

US 2011/0153798 A1  Jun. 23, 2011

(51) Int. Cl.  
*G06F 15/173* (2006.01)

(52) U.S. Cl.  
USPC ........... 709/223; 709/217; 709/201; 709/246; 713/153

(58) Field of Classification Search  
USPC ................. 709/223, 217, 201, 246; 713/153  
See application file for complete search history.

(56) References Cited

U.S. PATENT DOCUMENTS

| | | | |
|---|---|---|---|
| 7,873,750 B2 * | 1/2011 | Yabuta et al. ................. 709/250 |
| 2002/0069317 A1 * | 6/2002 | Chow et al. ................... 711/104 |
| 2002/0188786 A1 * | 12/2002 | Barrow et al. ................ 710/300 |
| 2003/0002253 A1 * | 1/2003 | Hillyard et al. ............... 361/687 |
| 2004/0085955 A1 * | 5/2004 | Walter et al. .................. 370/386 |
| 2004/0103300 A1 * | 5/2004 | Risan et al. ................... 713/200 |
| 2005/0015430 A1 * | 1/2005 | Rothman et al. ............. 709/201 |
| 2005/0097132 A1 * | 5/2005 | Cochran et al. ............ 707/104.1 |
| 2005/0114593 A1 * | 5/2005 | Cassell et al. ................ 711/114 |
| 2005/0195660 A1 * | 9/2005 | Kavuri et al. ............ 365/189.05 |
| 2005/0235364 A1 * | 10/2005 | Wilson ............................ 726/28 |
| 2006/0194460 A1 * | 8/2006 | Chen et al. .................... 439/108 |
| 2007/0008985 A1 * | 1/2007 | Lakshmanamurthy et al. ............................ 370/412 |
| 2007/0094472 A1 * | 4/2007 | Marks et al. .................. 711/170 |
| 2008/0250176 A1 * | 10/2008 | Pujol et al. .................... 710/105 |

* cited by examiner

*Primary Examiner* — Wing F Chan  
*Assistant Examiner* — Benjamin M Thieu  
(74) *Attorney, Agent, or Firm* — Christopher K. Gagne

(57) ABSTRACT

A remotely managed expandable multi-user computer system is provided. The computer system includes a removable compute cartridge and a removable storage cartridge allowing easy upgrade of the computer system. The computer system self-configures when powered on to allow remote management by another system over a network. Automatic failover support is provided without the need for a separate compute element. A self-configurable removable secure-to-wireless converter to couple to a client computer system allows secure communications between the multi-user system and the client computer system via a wireless network.

22 Claims, 9 Drawing Sheets

METHOD AND APPARATUS FOR PROVIDING A REMOTELY MANAGED EXPANDABLE COMPUTER SYSTEM

FIELD

This disclosure relates to computer systems and in particular to multi-user computer systems.

BACKGROUND

In a computer system, solution integrators and service providers handle a wide variety of different Information Technology (IT) components, like, but not limited to compute, storage, networking and software. Thus, solutions and service offerings are custom integrated and engineered for each customer. This custom work is a significant variable (per deployment) cost which constrains the complexity of solutions which can be profitably delivered or operated by a computer system.

Typically, it is difficult to upgrade a computer system. A microprocessor upgrade may be performed easily by simply replacing a processor that is installed in a socket in the computer system. However, the upgraded computer system also typically requires updating the Basic Input/Output System (BIOS) after the microprocessor upgrade. An update to the BIOS may impact operating system (OS) revisions which may also require installing upgrades to the OS. Furthermore, replacement of the BIOS may result in loss of user data, for example, Internet favorites or mail file associations. This complicated process deters microprocessor upgrades in the computer system.

Wired networks require expensive wiring installation and physical locations of computers in an office environment are dependent on the physical locations of wired network communication points. The addition of a wireless network involves the addition of a wireless router, a wireless network interface in each client computer, and installing software to control the wireless network interface in each client computer. In addition a complicated configuration procedure is performed in order to initialize the wireless network interface including authentication and security dependent on the type of wireless router or access point.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
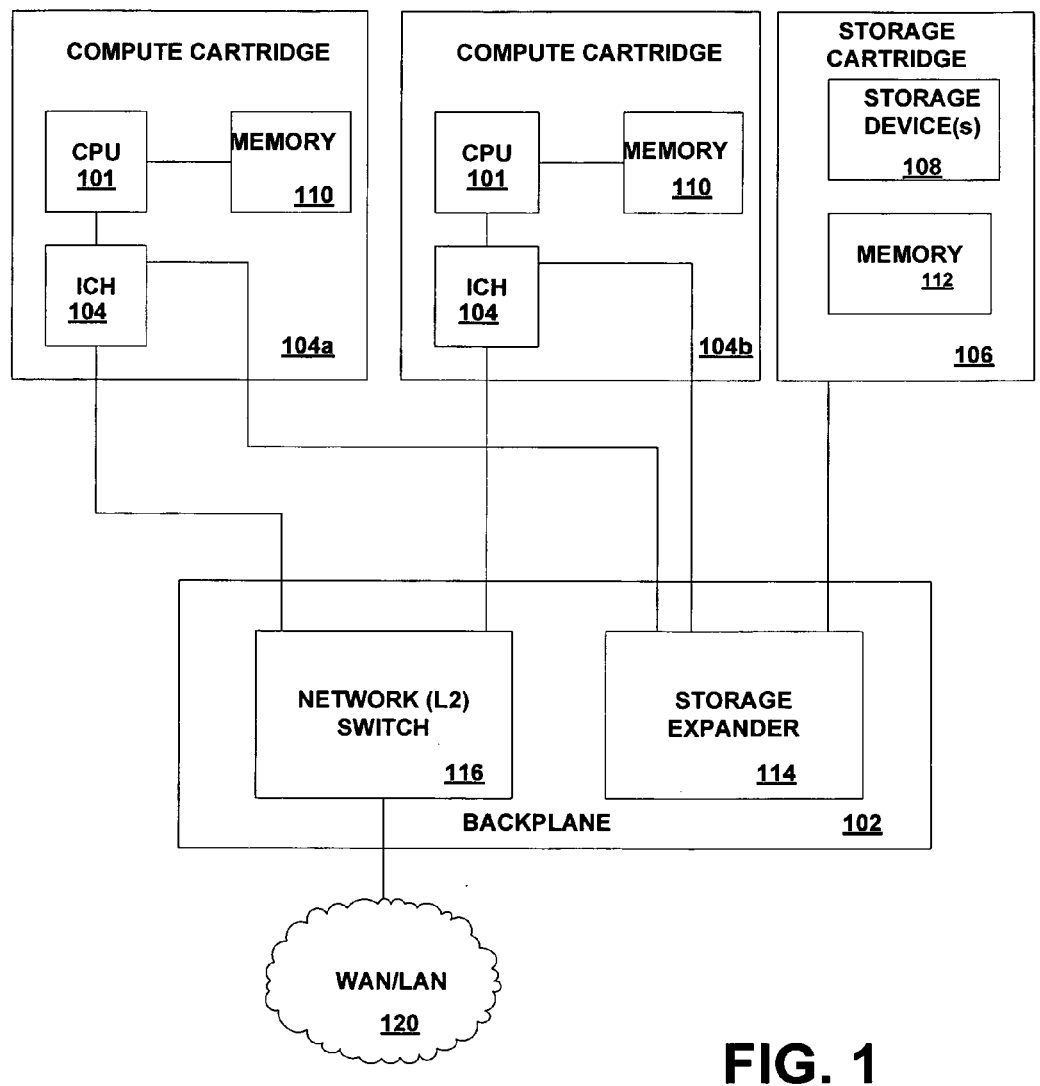
FIG. 1 is a block diagram of an embodiment of a remotely managed expandable multi-user computer system according to the principles of the present invention.

FIG. 1 is a block diagram of an embodiment of a remotely managed expandable multi-user computer system 100 according to the principles of the present invention. The system 100 is scalable and upgradeable via installation of user-replaceable compute cartridges 104a, 104b and storage cartridges 106 in a backplane 102. The backplane 102 has n-slots for installing the cartridges 104a, 104b, 106. A compute cartridge 104a, 104b or storage cartridge 106 can be installed in any of the n-slots. In the embodiment shown, the system includes two compute cartridges 104a, 104b and one storage cartridge 106.

The system 100 decouples disk storage elements (storage devices) 108 in the storage cartridge 106 from compute elements (CPUs 101) in the compute cartridges 104a, 104b. This results in "stateless" compute nodes (elements) which enable easy migration of users and migration and upgrade of operating system and software applications. The system 100 provides a platform-centric storage model in which disk storage 108 in the storage cartridge 106 is a global resource that can be mapped to any of the compute resources in the compute cartridges 104a, 104b in the system 100. The storage subsystem that includes the storage cartridge 108 can use a variety of block and file-based storage models including: "Virtual Direct Attached Storage (DAS)", Network Attached Storage (NAS), Virtual Storage Array Network (SAN) and others.

Each compute cartridge 104a, 104b is "stateless", that is, personalization of a compute element included in the stateless modular compute cartridge is stored in non-volatile memory. In an embodiment, the personalization is stored in a non-volatile memory included in the compute cartridge 104a, 104b, for example, memory 110 which includes a removable flash memory component. The removable flash memory component is transferable between compute cartridges 104a, 104b, that is, it can easily be removed and installed on another compute cartridge 104a, 104b. In another embodiment, the flash memory device can be located in the backplane 102.

Alternatively, in another embodiment the personalization of the compute element in a compute cartridge 104a, 104b can be stored in non-volatile memory such as a disk drive (storage device 108) in the storage cartridge 106 that is accessible by the stateless modular compute cartridge 104a, 104b. For example, the personalization can be stored in a known physical sector in a storage device 108 in the storage cartridge 106. In yet another embodiment, the personalization of the compute element can be stored in the "cloud", that is, on a remote system accessible via the Wide Area Network (WAN)/Local Area Network (LAN) 120.

The compute cartridge 104a, 104b includes a processor (Central Processing Unit (CPU)) 101 and an Input/Output (I/O) Controller Hub (ICH) 104. The processor 101 may be Intel® Atom™ or a multi-core processor such as Intel® Pentium D, Intel® Xeon® processor, or Intel® Core® Duo processor, Intel® Core™ i7 Processor or any other type of processor.

The memory 110 may include Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM), Flash or any other type of non-volatile or volatile memory. The memory 110 may store an operating system 120, for example, Microsoft's® Windows® Operating System (OS), Linux Operating System, Unix Operating System or any other type of operating system.

In an embodiment, a Flash memory included in the memory 110 stores a Virtual Platform Operating Environment (VPOE). The VPOE includes base services for the system 100 including a Xen Hypervisor, a SuSE Linux Enterprise Server (SLES) 10 Linux Domain 0 including a VSB Management Stack, Lightweight Directory Access Protocol (LDAP) and Domain Name Server (DNS) services, and a virtual appliance router.

The ICH (or platform controller HUB) 104 may include a storage Input/Output (I/O) controller 120 for controlling communication with at least one storage cartridge 106 via the backplane 102. The ICH 104 may communicate with the storage device 108 over a storage protocol interconnect using a serial storage protocol such as, Serial Attached Small Computer System Interface (SAS) or Serial Advanced Technology Attachment (SATA).

A version of the SATA protocol is described in "Serial ATA: High Speed Serialized AT Attachment," Revision 1.0a, published on Jan. 7, 2003 by the Serial ATA Working Group (hereinafter termed the "SATA standard"). A version of the SAS protocol is described in "Information Technology—Serial Attached SCSI—1.1," Working Draft American National Standard of International Committee For Information Technology Standards (INCITS) T10 Technical Committee, Project T10/1562-D, Revision 1, published Sep. 18, 2003, by American National Standards Institute (ANSI) (hereinafter termed the "SAS Standard").

A version of the SAS protocol is described in "Information Technology—Serial Attached SCSI—1.1," Working Draft American National Standard of International Committee For Information Technology Standards (INCITS) T10 Technical Committee, Project T10/1562-D, Revision 1, published Sep. 18, 2003, by American National Standards Institute (ANSI).

Each storage cartridge 106 includes a memory 112 that is accessible via a serial bus, for example the I2C bus or System Management (SM) bus. The memory 112 includes a non-volatile memory and in one embodiment the non-volatile memory is an Electrically Erasable Programmable Read Only Memory (EEPROM). The EEPROM stores meta-data describing services stored in the storage device 108 in the storage cartridge 106. In another embodiment, the meta-data can be stored in a partition in the storage device 108 instead of in the memory 112. In addition to describing services, the meta-data may also store Redundant Array of Independent Disks (RAID) configuration data if the storage device(s) 108 is configured as a RAID device.

Figure 2:
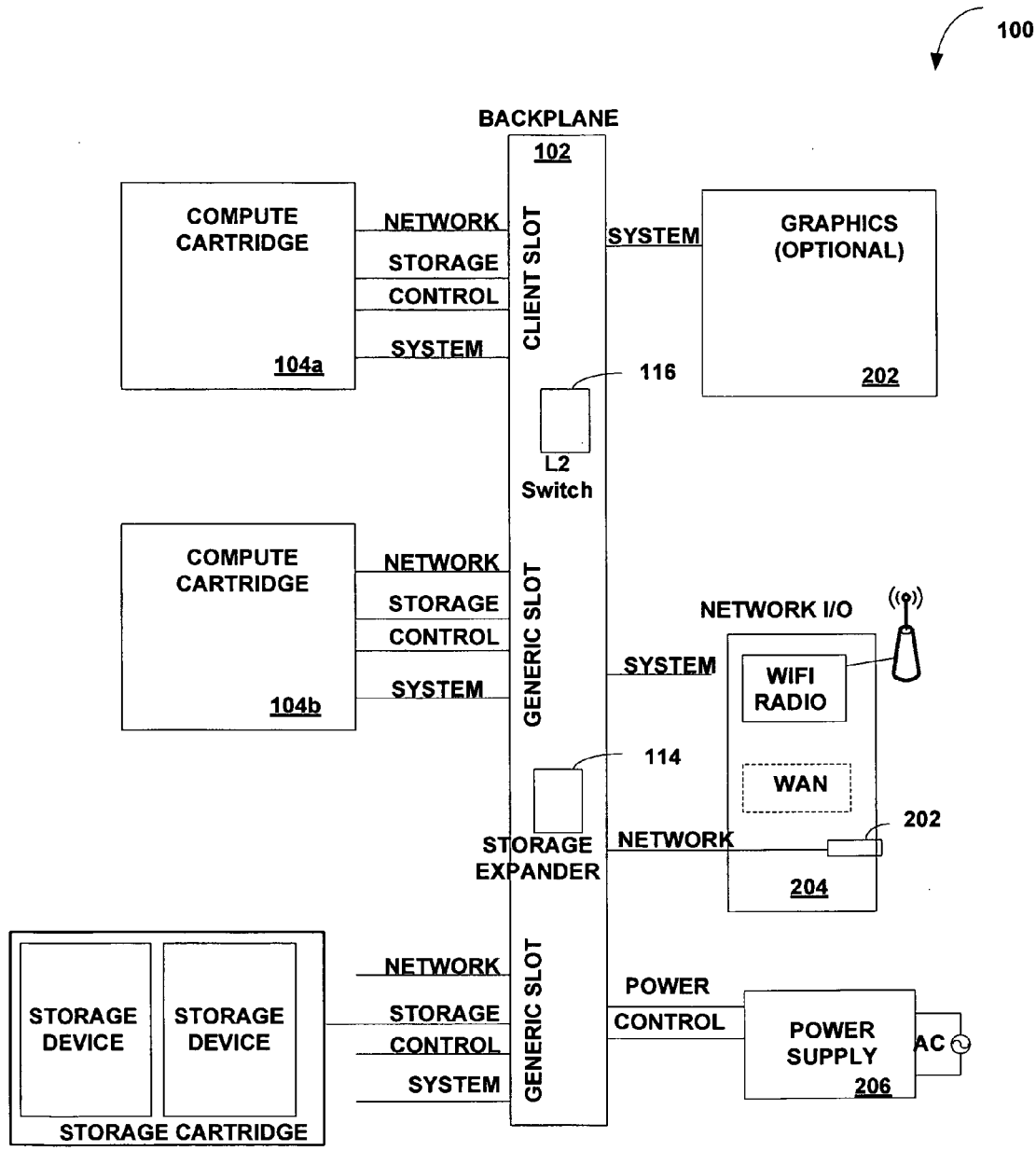
FIG. 2 is a more detailed block diagram of the remotely managed expandable multi-user computer system shown in FIG. 1.

FIG. 2 is a more detailed block diagram illustrating the embodiment of the remotely managed expandable multi-user computer system 100 shown in FIG. 1.

Referring to FIG. 2, in an embodiment, the system 100 includes a backplane 102 including one client slot and two generic slots allowing up to three stateless modular cartridges to be installed in the system 100. In the embodiment shown in FIG. 2, system 100 includes two different types of stateless modular cartridges including compute cartridges 104a, 104b and a storage cartridge 106. Each of the respective cartridges 104a, 104b, 106 is replaceable in the event of hardware failure or as a system upgrade.

In an embodiment, the backplane 102 also can include an additional two slots (other than a generic or client slot) to allow a graphics card 202 and a network interface card 204 to be installed in the system 100. In an embodiment, the network interface card 204 can include many different network interfaces including an Ethernet switch, a WIFI radio, and a broadband modem.

In another embodiment, one slot can be designated as a client slot to support additional Peripheral Component Interconnect Express (PCIe) and Universal Serial Bus (USB) based peripheral. The wireless network Input/Output (I/O) card 204 can provide network communications with client devices via a wireless network.

In other embodiments, there can be a minimum of two slots (one generic slot, one client slot) allowing one compute cartridge 102 and one storage cartridge 104a, 104b to be installed in the system 100.

As shown in FIG. 2, each respective client slot and generic slot in the backplane 102 includes at least one system bus interface, serial storage bus interface, control bus interface and network interface. In an embodiment, the system bus is a Peripheral Component Interconnect Express (PCIe) system bus, the control bus is an Inter-Integrated Circuit (I2C) bus used to attach low-speed peripherals, the serial storage bus is a Serial Attached Small Computer Systems (SAS) Interface bus and the network bus is Ethernet, for example, 1 Gigabit (1 Gb) Ethernet.

As shown in FIG. 1, the compute cartridge 104a is coupled to the client slot and the compute cartridge 104b is coupled to the generic slot. Each respective compute cartridge 104a, 104b is coupled to the backplane 102 via the network bus, serial storage bus, control bus and the system bus. However, the storage cartridge 106 is only coupled to the backplane 102 via the serial storage bus.

The backplane 102 also includes a storage expander 114 which in an embodiment is a Serial Attached Small Computer Systems Interface (SAS) expander to allow for any-to-any mapping of compute cartridges 104a, 104b to storage cartridges 106.

Figure 3:
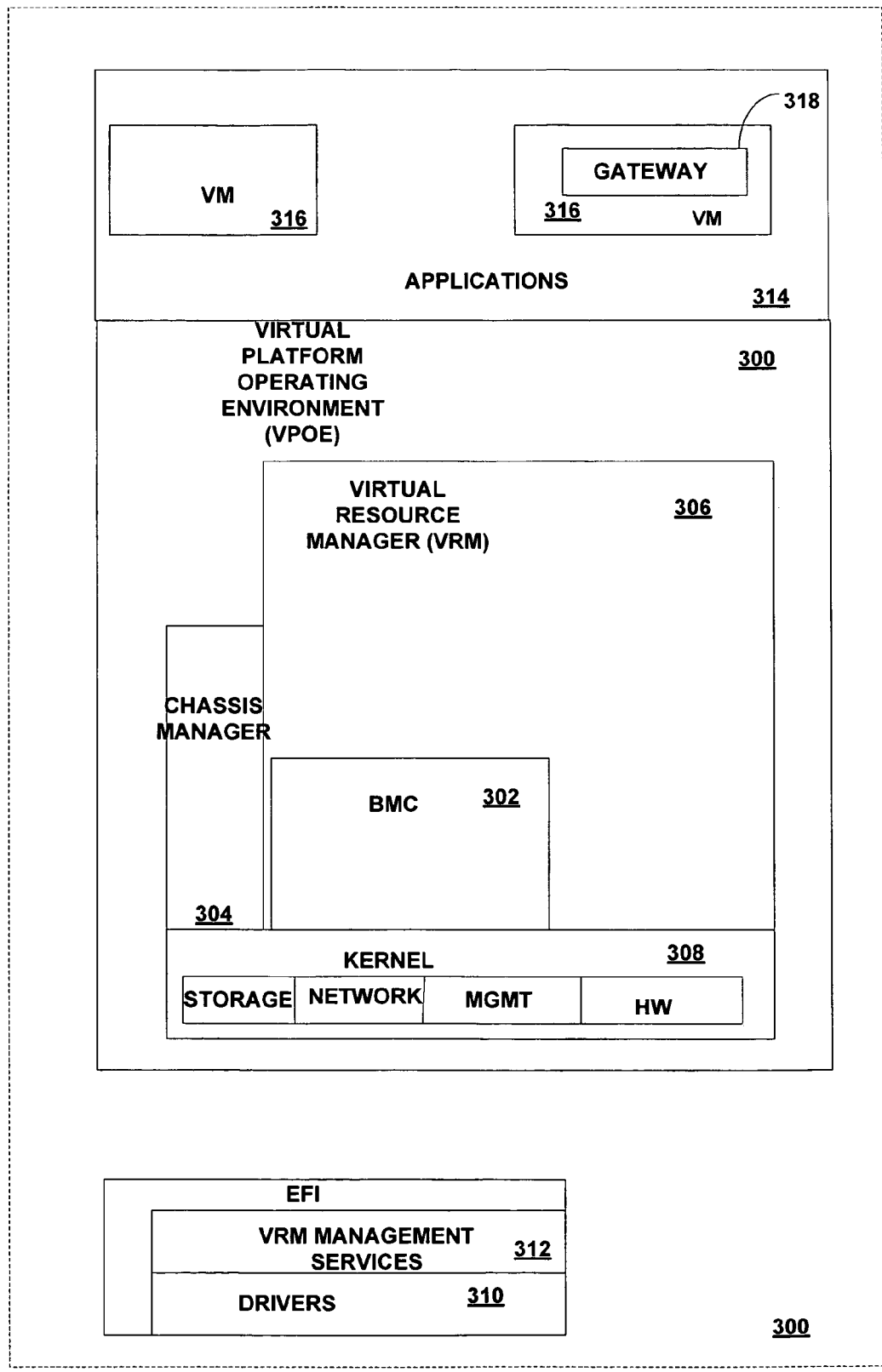
FIG. 3 is a block diagram illustrating an embodiment of software modules included in the multi-user computer system shown in FIG. 2.

FIG. 3 is a block diagram illustrating an embodiment of software modules that may be stored in memory 110 in any of the compute cartridges 104a, 104b in system 100 shown in FIG. 2.

Services can be "downloaded" to the Virtual Machines (VM) 316 from a remote system over an external network. An Application Program Interface (API) is provided to provision and control the Virtual Machine ("appliance") 316 through the external network, for example, through an Ethernet network.

The Virtual Platform Operating Environment (VPOE) 300 includes core elements that execute on each compute cartridge 104a, 104b.

In an embodiment, the baseboard management controller (BMC) service (software module) 302 includes management functions to manage the compute cartridge 104a, 104b, for example, functions to manage temperature and power for the system 100. In other embodiments, the BMC may be included in an embedded controller. The BMC service 302 can also include functions to configure I2C resources. A BMC is a microcontroller that manages an interface between system management software and the hardware in the system 100. Sensors in the system 100 report parameters such as temperature, cooling fan speed, and power mode. The BMC service 302 can issue an alert if any of the parameters indicate a potential failure.

The chassis manager 304 discovers and manages resources through the BMC service 302 and also manages resources in the system 100 that are not included in the compute cartridge 104a, 104b. For example, the chassis manager 304 can manage Light Emitting Diodes (LEDs) and the graphics card 202. The chassis manager 304 can also communicate with a respective BMC service 302 on other compute cartridges 104a, 104b in the system 100.

The Virtual Resource Management (VRM) manager 306 includes non-low level management functions of the system 100. The VRM manager 306 obtains system information from the chassis manager 304 and BMC service 302 in order to manage networking services and virtualization functions. The VRM manager 306 can either be a manager or an agent. The determination as to whether a VRM manager 306 in a respective compute cartridge 104a, 104b is a manager or an agent for the system 100 is negotiated based on policy.

A Virtual Memory Manager/Operating System (VMM/OS) in the Virtual Machine VM 316 is the core virtualization layer and will be described later in conjunction with FIG. 4.

Drivers 310 provide functions that directly control hardware in the system 100. For example, drivers are included to control an Ethernet controller and a storage controller (Host Bus Adapter (HBA)) in the compute cartridge 104a, 104b.

The VSB management Services (EFI) 312 is a set of management functions to allow for remote management in the event of failure of the Virtual Platform Operating Environment (VPOE) 300 or when the VPOE 300 is not available, for example, during firmware upgrade or configuration of the system 100.

All management communication between compute cartridges 104a, 104b in the system 100 occurs via communication paths, for example, using Transport Control Protocol/Internet Protocol (TCP/IP). In addition, the chassis manager 304 and the BMC software modules 302 can use the I2C interface to communicate with components in the system 100.

The applications 314 can include one or more of the following: router, firewall, PBX, Soft Access Point (AP), Microsoft® Vista and Microsoft® Exchange.

When a compute cartridge 104a, 104b is plugged into (electrically coupled to) the backplane 102 the CPU 101 starts executing the VPOE stored in memory 110. The BMC service 302 determines the identifier of the slot to which the compute cartridge 104a, 104b is electrically coupled. The BMC service 302 provides the slot identifier to the chassis manager 304. The chassis manager 304 sends packets on the local network within the system 100 to negotiate master/slave responsibilities. In an embodiment, the packets are Internet Protocol (IP) Multicast packets sent to a group of known IP addresses. In other embodiment, the packets are broadcast, that is sent to a broadcast address, a network address that allows the packets to be sent to all nodes on a network. IP Multicast and broadcast packets are standard network packets well-known to those skilled in the art.

After a hierarchy has been established, the primary chassis manager 304 discovers the topology of the system 100, that is, which slots are populated with compute cartridges 104a, 104b and storage cartridges 106). After the topology of the system has been discovered, the topology is provided to the Virtual Resource Manager (VRM) 306.

Next, the Master VRM begins the process of collecting meta-data to determine the system profile. The master VRM can reconfigure the switch to ensure that the Wide Area Network (WAN) port is connected to the slot corresponding the compute cartridge with the Master VRM via the network bus and then brings up the appropriate base services, for example, (LDAP or DNS), the virtual appliance gateway 318 and finally the remaining services (in the form of virtual appliances). System meta-data stored in non-volatile memory in the system 100 is updated to ensure that in subsequent power on initialization, operating system boot and cartridge replacements that the correct system profile is used.

A newly installed compute cartridge broadcasts messages in an attempt to determine whether a chassis manager 304 and VRM Master already exist. The chassis manager 304 detects when a new compute cartridge 104a, 104b is installed in the system 100 and discovers the capabilities of the newly installed compute cartridge 104a, 104b. After the primary chassis manager 304 has discovered the compute cartridge 104a, 104b and its capabilities, the Virtual Resource Manager assigns services to the newly discovered compute cartridge 104a, 104b, in order to balance the workload across the system 100.

The chassis manager 304 also detects when a new Storage Cartridge 106 is installed in the system 100. The chassis manager 304 notifies the VRM. The VRM reads meta-data stored in non-volatile memory on the storage cartridge or on the storage media in the storage cartridge 106. If the storage cartridge 106 has no meta-data stored or the storage media in the storage cartridge 106 is not partitioned correctly, the storage media is reformatted based on the storage policy of the system 100. If the meta-data is in conflict with the system requirements, an alert is sent to request assistance of a user/operator. The alert may be sent via electronic mail, Short Message Service (SMS) or using another type of messaging protocol.

If the meta-data indicates that the storage cartridge 106 is a self-contained appliance, the VRM assigns the storage cartridge 106 to a compute cartridge 104a, 104b. Next the compute cartridge 104a, 104b boots a virtual appliance that is stored in a storage device (disk drive) in the storage cartridge 106. The meta-data stored in the storage cartridge 106 reflects what is relevant to the appliance and is not used to store general system meta-data.

Figure 4:
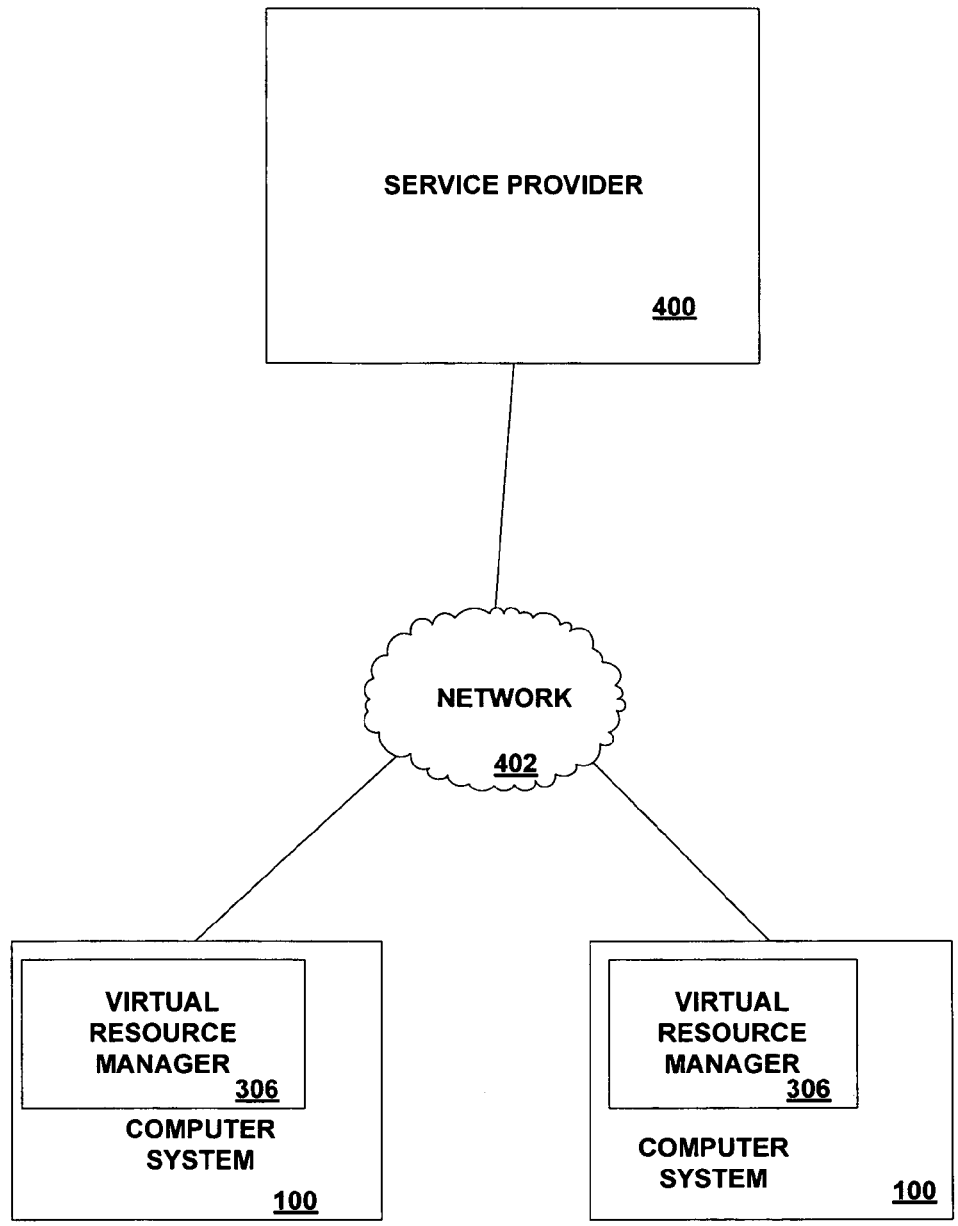
FIG. 4 is a block diagram illustrating a service provider environment that includes a service provider connected via a network to a plurality of remotely managed expandable multi-user computer systems.

FIG. 4 is a block diagram illustrating a service provider environment that includes a service provider 400 connected via a network 402 to a plurality of remotely managed expandable multi-user computer systems 100. Each of the expandable multi-user computer systems 100 is remotely managed via the network 402 by the Service Provider 400.

In an embodiment, each of the plurality of computer systems 100 is deployed as a self-management service delivery platform within a small business or home. A user of the computer system 100 subscribes with the service provider 400 for one or more profiles and software applications that are provided by the service provider 400 via the network 402. On initial deployment, each of the plurality of computer systems 100 includes all of the necessary hardware and software to begin delivering services to clients (users) of the system 100.

The computer system 100 requests from the Service Delivery infrastructure, profiles and software applications based on a subscription that the user of the computer system 100 has established with the service provider 400. The infrastructure within the service provider (carrier) provides the necessary service delivery capabilities in addition to the already deployed device management infrastructure. In an embodiment the VSB manager 306 includes a set of profiles that are added to the existing management infrastructure, for example, Technical Report TR-069 based profiles).

A virtual resource manager (VRM) 306 included in each compute cartridge 104a, 104b in the computer system 100 provides support for scaling and availability. The Virtual Resource Manager (VRM) 306 manages multiple virtual machines (VMs) or virtual appliances (VAs) which typically run on one or more Central Processing Units (CPUs) (processors) 101 in the compute cartridges 104a, 104b in the virtualized computer system 100. The VRM 306 monitors the execution state, performance and efficiency of the VMs. Furthermore, the VRM 306 dynamically distributes the VMs across multiple compute cartridges 104a, 104b in order to efficiently balance the compute resource requirements of each VM to maximize compute resource utilization across the computer system 100, while minimizing overall power utilization.

The VRM 306 executes on a CPU (processor) 101 in one of the compute cartridges 104a, 104b. Typically, a separate dedicated CPU 101 is used solely to implement the virtualized resource manager 306, which also adds to the cost of the overall system. By executing the VRM 306 locally on a CPU 101 in each of the compute cartridges 104a, 104b under management instead of using a separate dedicated processor 101, the cost of the system 100 is reduced. The cost reduction is due to elimination of the dedicated processor 101 and associated hardware related components.

In addition, scalability is provided by providing management locally instead of centrally. The VRM 306 can switch control automatically to another VRM 306 on different compute cartridge 104a, 104b if the compute cartridge that is providing management services' hardware fails, or the Operating System (OS) crashes or VRM software fails.

If there is a hardware or software failure, a failover mechanism automatically restarts the VRM 306 on a CPU 101 in another compute cartridge 104a, 104b within the computer system 100, thus enabling continued management and control of the computer system 100. Furthermore, deploying the VRM 306 as part of the computer system 100, allows the computer system 100 to be self-managing and thus reduces the requirements on the central infrastructure, that is, management by the remote service provider.

There is a secure, dedicated network connection between all VRMs 306. In an embodiment, the dedicated network is provided via a network switch 116 (FIG. 1). In other embodiments, the dedicated network can be provided via direct attached Ethernet ports, or via a combination of a Virtual Local Area Network (VLAN) tag enabled Ethernet switch and VLAN software executing on a CPU 101 in the compute cartridge 104a, 104b. In the embodiment shown in FIG. 2, the network switch 116 is an un-managed VLAN capable switch to provide connectivity to the compute cartridges 104a, 104b. The dedicated management network is used by the VRMs 306 to communicate securely. As the management network is a dedicated network internal to the computer system 100, it is extremely resilient to attack from hackers.

In an embodiment, the computer system 100 is used in a small business and managed remotely over a network 402 by the service provider 400. Shifting the responsibility of management, improves ability of a remote management system (service provider) 400 to manage a large number of remote computer systems 100. A VRM monitor (not shown) that periodically runs on every compute cartridge 104a, 104b monitors the VRM 306. The VRM monitor restarts the VRM 306 when the VRM monitor determines that the VRM 306 has failed, that is, is no longer active (executing).

In an embodiment, the VRM 306 is implemented as a daemon within the operating system's management virtual machine (VM). A daemon is a program that is typically initiated as a background process when booting the operating system.

In an embodiment, the VRM daemon has two operational modes. The first operational mode is master mode in which the VRM daemon assumes the global management responsibility of the VRM function. The second operational mode is slave mode in which the VRM daemon acts as a server of commands/requests made from the VRM daemon in master mode executing on a CPU 101 in another compute cartridge 104a, 104b. In a computer system 100 that is managed by the VRM daemon, the VRM daemon runs as the VRM master on the CPU 101 in one compute cartridge 104a, 104b while VRM deamons executing on other CPUs 101 in the other compute cartridges 104a, 104b are in slave mode.

The VRM daemon operating in master mode ("VRM master") repeatedly broadcasts a declaration message also referred to as a beacon at a periodic interval to all other VRM deamons that are operating in slave mode ("VRM slaves") in compute cartridges 104a, 104b in the computer system 100. The declaration beacon is received by other VRM slaves. The declaration beacon indicates that the VRM master has been established and is operating and that the VRM master exists at the Internet Protocol (IP) address specified within the declaration beacon. If the VRM daemon receiving the message is currently in startup mode, the message indicates that the master has already been established, so the receiving VRM daemon knows that it is a slave daemon. Thus, the receiving VRM daemon registers as a slave by sending a registration message to the VRM master.

When a slave VRM registers with the VRM master, the VRM master acknowledges the request with a registration number representing the order in which slave VRMs have registered. Thus, the first slave VRM to register gets a registration number of 1, the second, 2, and so on until all of the VRM daemons have received a registration number.

If there is a failure on the compute cartridge 104a, 104b on which the VRM master is running, or if the VRM or system software fails, or if the VRM master auto-detects any problem related to its own operation, the VRM master stops sending its declaration beacon. Failure to receive a declaration beacon, after a specified timeout interval, from a previously declared VRM master is a failover condition on which a previously registered VRM slave can promote itself into the role of the new VRM master. The new VRM master declares its master role to all VRM slaves by broadcasting its declaration beacon (with its Internet Protocol address) at the established periodic interval. Each VRM slave receives the new declaration message and deduces a failover event has occurred because the IP address in the declaration beacon has changed. As a result, each VRM slave receiving the new declaration message re-registers with the new VRM master.

Each VRM slave waits for a different failover timeout period, based on its assigned registration number. Thus, the first VRM slave to be registered is the first VRM slave to detect the failover event and the first VRM slave assumes the master role without contention by other VRM slaves. If the first VRM slave has also failed, the next VRM slave to be registered is the next to detect the failover event and assume the master role.

Figure 5:
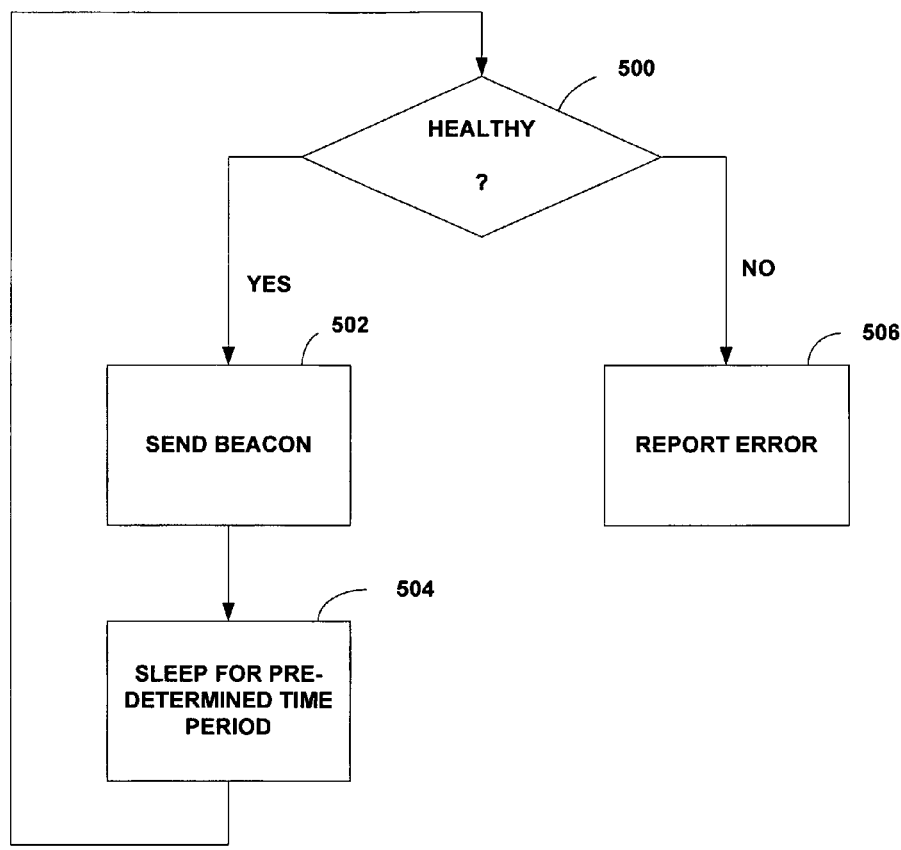
FIG. 5 is a flow diagram illustrating functions performed by a Virtual Resource Manager (VRM) daemon after the VRM daemon has determined that it is the master VRM daemon.

FIG. 5 is a flow diagram illustrating functions performed by a VRM daemon after the VRM daemon has determined that it is the master VRM daemon.

At block 500, the VRM master checks if an error has been detected in the compute cartridge 104a, 104b. The error may be due to hardware or software and may be detected by software or hardware. If an error has been detected, that is the system is not "healthy", processing continues with block 506. If not, processing continues with block 502.

At block 502, the VRM master sends using a broadcast address, a beacon (message) to slave VRM(s) using the master IP address. The beacon is sent over the dedicated management network. Processing continues with block 504.

At block 504, after sending the beacon, the VRM master sleeps for a predetermined fixed time period. Processing continues with block 500, to check if an error has been detected.

At block 506, an error has been detected, the VRM master stops sending its declaration beacon providing an indication to VRM slaves to take over as VRM master.

Figure 6:
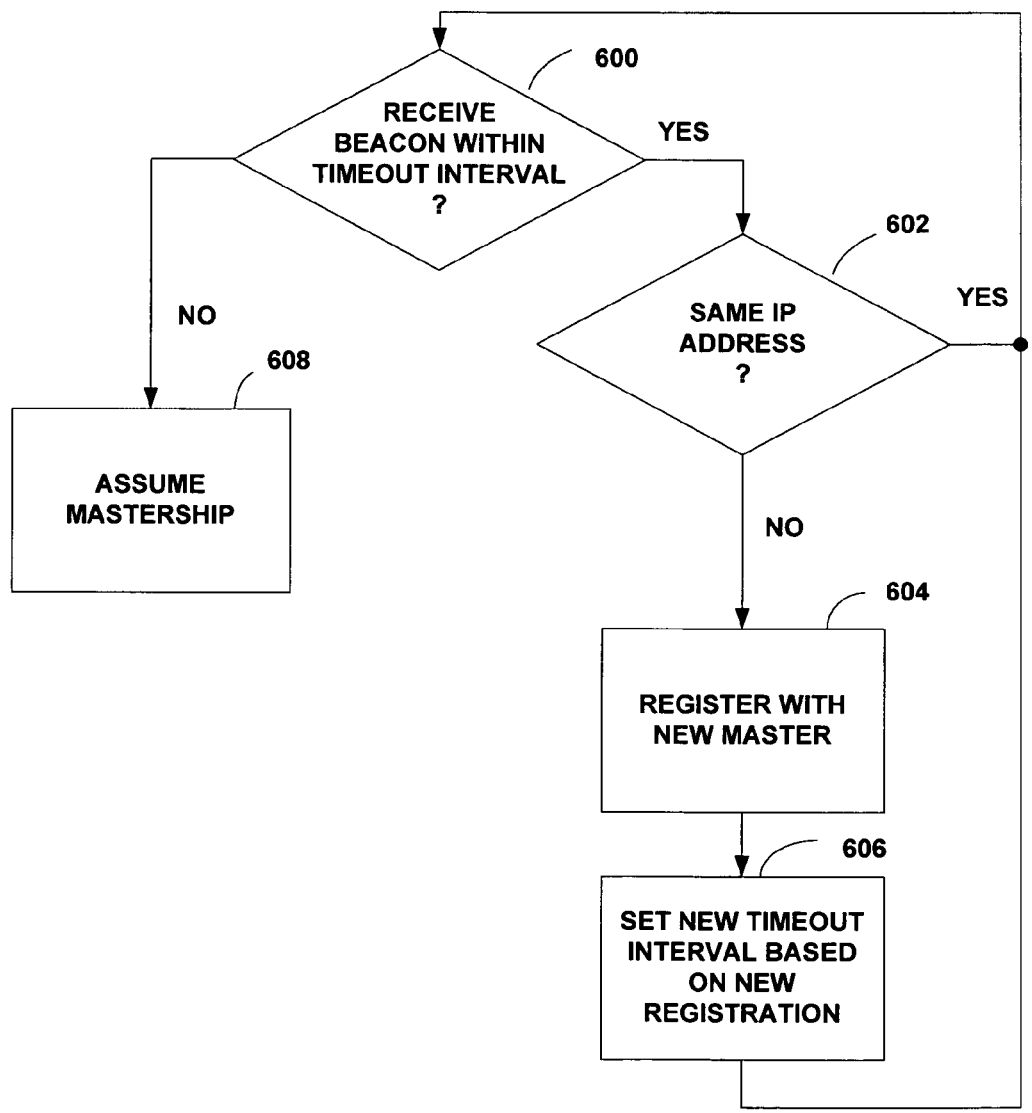
FIG. 6 is a flow diagram illustrating functions performed by a VRM daemon after the VRM daemon has determined that it is a VRM slave.

FIG. 6 is a flow diagram illustrating functions performed by a VRM daemon after the VRM daemon has determined that it is a VRM slave.

At block 600, the VRM slave waits to receive a beacon from the VRM master within a timeout interval (based on number assigned during registration with the VRM master). If the beacon is received within the timeout interval, processing continues with block 602. If the beacon is not received within the timeout interval, processing continues with block 608.

At block 602, the Internet Protocol (IP) address received in the packet (declaration beacon) is checked to determine if it is the same IP address that was received in the prior received declaration beacon. If so, the VRM master has not changed and processing continues with block 600 to continue to periodically check for received declaration beacons. If the received IP address is not the same, processing continues with block 604.

At block 604, the IP address has changed indicating another VRM 306 has taken over as VRM master. The VRM slave sends a registration packet to the new VRM master to register with the VRM master. The registration packet includes the IP address of the VRM slave. Processing continues with block 606.

At block 606, a new timeout interval is provided by the VRM master in response to the request to register the VRM slave. The VRM slave uses the new timeout value to determine if the declaration beacon has been received from the VRM master within the timeout period. Processing continues with block 600.

At block 608, as the declaration beacon was not received within the timeout interval, the slave VRM 306 assumes mastership.

Figure 7:
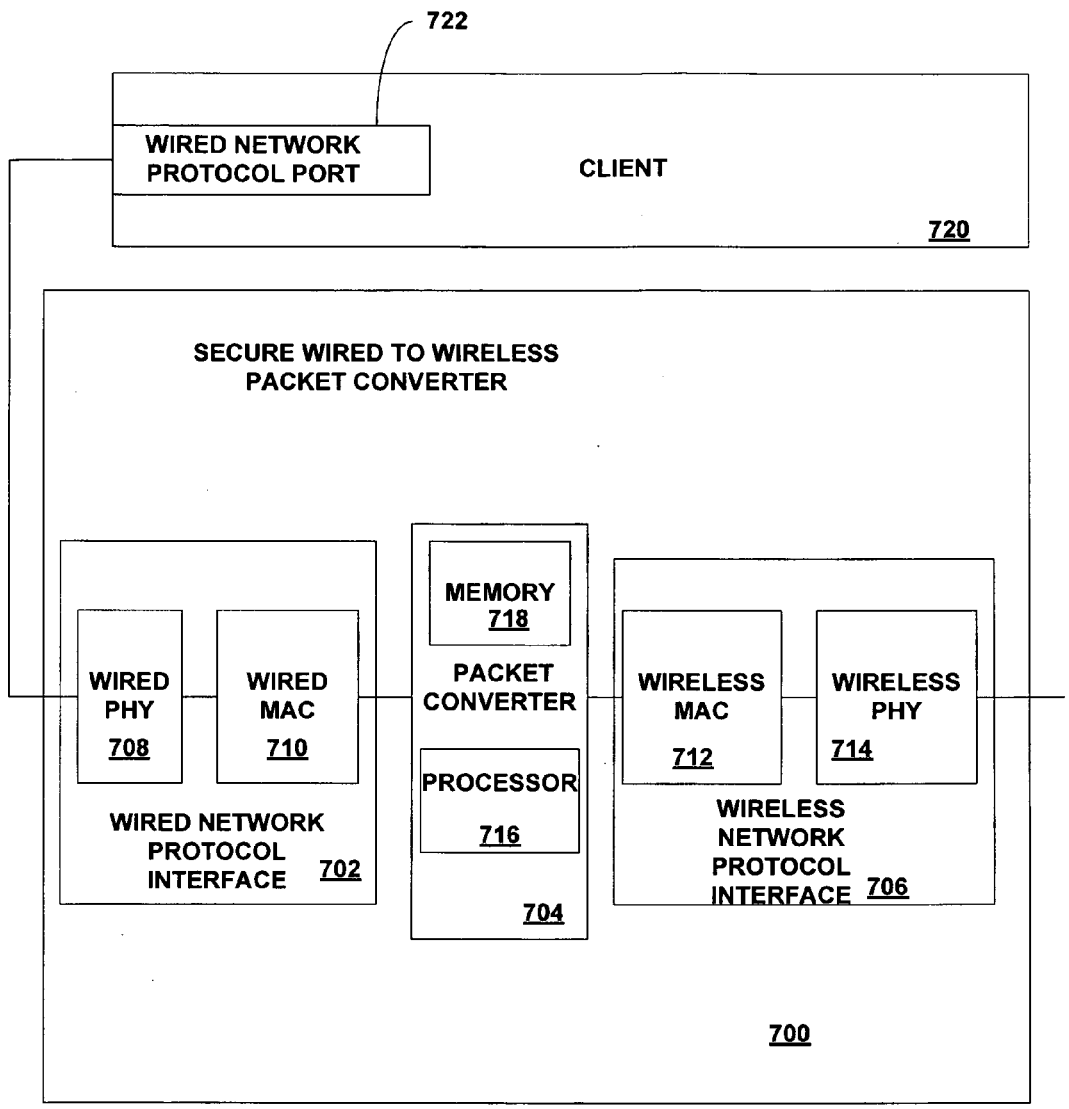
FIG. 7 is a block diagram of an embodiment of a secure wired-to-wireless converter according to the principles of the present invention.

FIG. 7 is a block diagram of an embodiment of a secure wired-to-wireless converter 700 according to the principles of the present invention. The secure wired-to-wireless converter 700 includes a secure wired network protocol interface 702 and a secure wireless network protocol interface 706.

A packet converter 704 that is coupled between the secure wired network protocol interface 702 and the secure wireless network protocol interface 706 performs wired-to-wireless packet conversion at the Media Access Control (MAC) (layer 2 (L2)) of the respective wired and wireless network protocol. The packet converter 704 also performs encryption and authentication and general packet flow control for the wireless network protocol and the wired network protocol. Wired network packets are typically not encrypted and authenticated.

In an embodiment, the packet converter 704 encrypts packets received by wired interface 710, and adds authentication information to the packets before sending them over the wireless interface 712. Similarly, the packet converter 704 handles encrypted packets received by wireless interface 712, by verifying authenticity and decrypting the packets into plain-text packets before sending them over the wired interface 710.

In an embodiment, a client (system/device) 720 that includes an interface (wired port) 722 supporting a wired network protocol can access an external network via the system 100 discussed in conjunction with FIG. 2 via a secure wireless network using the wired network protocol. The secure wired-to-wireless converter 700 is a standalone device that when coupled to a wired network protocol port 722 of the client 720 provides access to the secured wireless network via a secure wireless network protocol interface using the wired network protocol.

The secure wireless network protocol interface 706 may communicate with a wireless Local Area Network (LAN) access point (AP). For example, in an embodiment, the LAN AP may use the Institute of Electrical and Electronic Engineers (IEEE) 802.11 wireless network protocol. In an embodiment, the wireless LAN AP supports IEEE security measures such as, WiFi Alliance Wi-Fi Protected Access (WPA and WPA2), and WiFi Alliance Wi-Fi Protected Setup.

The client device may be a mobile (laptop, portable) computer, a desktop computer, a printer, an Internet Protocol (IP) phone, an IP camera or any other device that includes a wired network protocol interface. The wired network protocol interface allows the client device to communicate with other devices accessible via a wired network using methods well known to those skilled in the art. In an embodiment, the wired network protocol interface is an Ethernet port which supports the IEEE 802.3 wired network protocol.

In an embodiment, the wired network protocol interface 702 includes an Ethernet MAC/PHY chipset, for example, Intel® 82559 Fast Ethernet Controller, and the wireless network protocol interface 706 includes a wireless radio chipset, for example, Intel® Wireless WiFi Link 4965AGN, and the packet converter 704 includes a low power processor 716, for example, an x86 architecture processor, Intel® Atom™ or any other low power processor.

The packet converter 704 also includes memory 718. The memory 718 includes non-volatile memory to store a Personal Identification Number (PIN) and Media Access Control (MAC) addresses (for wired and wireless MACs), other credential information and software. In particular, the PIN is programmed for the packet converter 704 and stored in the non-volatile memory during the manufacturing process. In an embodiment, the composition of the PIN is in accordance with the standard WiFi Alliance Wi-Fi protected setup. The PIN and MAC addresses are provided to an Access Point (AP) to allow the AP to recognize the secure wired-to-wireless converter 700 which is required in order to allow the AP to communicate with the secure wired-to-wireless converter 700. However, the secure wired-to-wireless converter 700 allows a client device to communicate with the AP with no knowledge of the PIN or MAC addresses before recognizing the PIN. After the PIN is recognized by the AP, WiFi Protected Setup protocol is used between secure wired-to-wireless converter 700 and the AP to exchange other information such as MAC address of the wired interface in the secure wired-to-wireless converter 700. Thus, the PIN is never exposed to the client device connected to the wired interface 702.

In an embodiment, the secure wired-to-wireless converter 700 is a small, closed hardware device with one external connector. In an embodiment, secure wired-to-wireless converter 700 is the size of a human thumb that includes an external Ethernet connector and an external power connector. The external Ethernet connector is provided to allow the secured wired-to-wireless converter 700 to connect to the client device. The external power connector is provided to allow the secure wired-to-wireless converter 700 to connect to a power supply. An antenna for the wireless interface is inside the housing of the secured wired-to-wireless converter 700 and not externally visible.

In another embodiment the secure wired-to-wireless converter 700 only includes an external Ethernet connector because the client device supplies power over Ethernet.

In yet another embodiment, power is supplied to the secure wired-to-wireless converter 700 by an internal battery placed inside the housing. The internal battery can be a replaceable battery or a rechargeable battery.

The secure wired-to-wireless converter 700 is easy to use. In contrast to a wireless network protocol interface that is included in a client computer, no software setup procedure is required to configure the wireless network protocol interface in order to access the wireless network.

Furthermore, the secure wired-to-wireless converter 700 provides more security than a wireless network protocol interface that is installed in a client computer. Only devices that are physically connected to the secure wired-to-wireless converter 700 may access because the PIN required to use the wireless network is not provided to the client system. Instead, the PIN is downloaded by the AP to be stored in non-volatile memory in the secure wired-to-wireless converter 700. Thus, a hacker cannot learn the PIN required to use the wireless network by accessing the client system because the PIN is stored in memory 718 in the secure wired-to-wireless converter 700 and is not accessible by the client system.

Advantages of the secure wired-to-wireless converter 700 include ease of use, the avoidance of an expensive wired network, added mobility for client computers, increased security and ease of installation. For example, a client system that only has a wired network protocol network port can easily obtain use of a wireless network by plugging the secure wired-to-wireless converter 700 into a wired network port. The secure wired-to-wireless converter 700 can be used with any standard based client device and any wireless AP supporting WiFi Alliance WiFi Protected Setup using the standard WiFi Alliance Wi-Fi Protected Setup.

Figure 8:
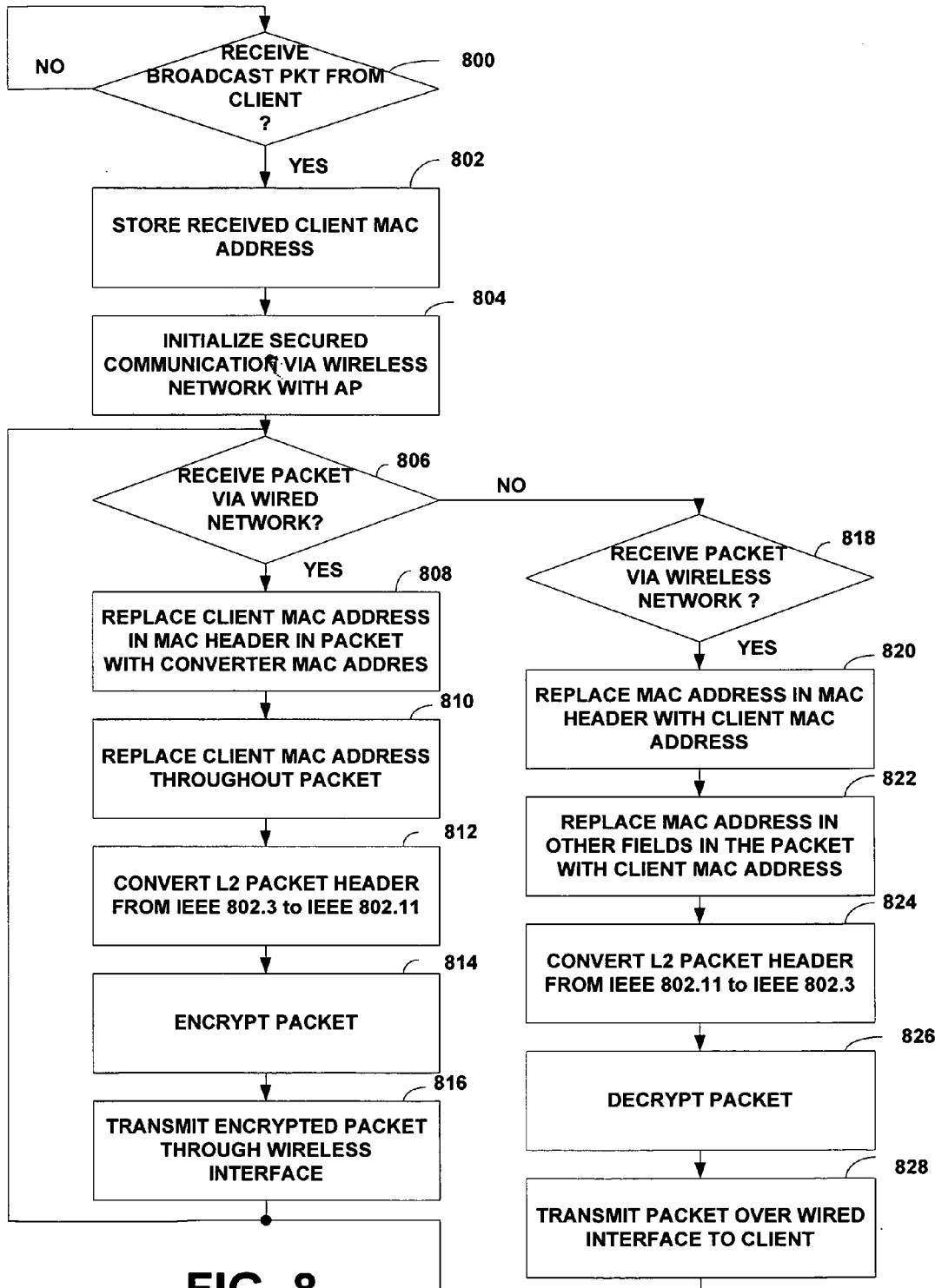
FIG. 8 illustrates an embodiment of a method for using the secure wired-to-wireless converter shown in FIG. 7.

FIG. 8 illustrates an embodiment of a method for providing communication between the AP and the client device over a secure wireless network via the secure wired-to-wireless converter 700 shown in FIG. 7.

Upon detecting that the secure wired-to-wireless converter 700 is coupled to the client device via the secure wired network protocol interface, the secure wired-to-wireless converter 700 automatically establishes authenticated, secure communication between the client device and the AP.

At block 800, after the secure wired-to-wireless converter 700 is coupled to (electrically connected to) the wired network (for example, via the IEEE 802.3 or Ethernet) port of the client device, the secure wired-to-wireless converter 700 receives at least one broadcast packet transmitted from the client device.

In an embodiment, the broadcast packet is transmitted by the client as part of an Address Resolution Protocol (ARP) request/response procedure initiated by the client device to find a peer Internet Protocol (IP) device on the network. Other network communication protocols, for example, Dynamic Host Configuration Protocol (DHCP) also generate a similar broadcast packet.

Upon detection of a received broadcast packet, processing continues with block 802. Otherwise, processing continues with block 800 to monitor packets received on the wired network port.

At block 802, the payload of the received broadcast packet includes the MAC address of the wired network port of the client device. This MAC address is referred to as the "client MAC address". The client MAC address is read from the received broadcast packet and stored in memory 718 in the secure wired-to-wireless convertor 700. Processing continues with block 804.

At block 804, the secure wired-to-wireless converter 700 is automatically initialized to communicate over the wireless network with the AP that has been preconfigured with the secure wired-to-wireless converters' MAC address and PIN. The wireless PHY 714 in the wireless network protocol interface 706 in the secure wired-to-wireless converter 700 includes a wireless radio having a unique MAC address referred to as a "converter MAC address". Using the converter MAC address, the secure wired-to-wireless converter 700 turns on a wireless radio in the wireless network protocol interface 706 and starts an association procedure with the AP over the wireless network via the wireless radio. After an association with the AP has been established, the secure wired-to-wireless converter 700 continues with the secure connection setup procedure using the stored PIN, according to the WiFi Alliance Wi-Fi Protected Setup procedure. The secure wired-to-wireless converter 700 is authenticated with the AP, and starts secure communication with the AP according to the secure communication defined by IEEE802.11i and WiFi Alliance Wi-Fi Protected Access (WPA and WPA2). Processing continues with block 806.

At block 806, the secure wired-to-wireless converter 700 is configured and ready to transfer packets between the wired network protocol interface 702 and the wireless network protocol interface 706. If a wired network protocol packet is received, processing continues with block 808. If not, processing continues with block 818 to check if a wireless network protocol packet has been received.

At block 808, for each packet received by the wired network protocol port that is electrically coupled to the wired network port of the client device, the secure wired-to-wireless converter 700 replaces the source MAC address of the packet, that is, "client MAC address" with the "converter MAC address. Processing continues with block 810.

At block 810, the secure wired-to-wireless converter 700 replaces the source MAC address included in any higher layer protocols (headers) in the packet that includes the client MAC address as a part of its header or payload, with the converter MAC address. Processing continues with block 812.

At block 812, the secure wired-to-wireless converter 700 converts the layer 2 (L2) packet header in the packet from the wired network L2 header, for example, IEEE 802.3 to the wireless network L2 header, for example, IEEE 802.11. In an embodiment, the wired network L2 header is a IEEE 802.3 header that includes a 6-byte MAC destination address, a 6-byte MAC source address and a Type Field. The wireless network L2 header is an 802.11 header that includes a 6-byte MAC destination address, a 6-byte MAC source address and a 6-byte MAC address of the wireless station (access point) that is to receive the packet (frame).

In an embodiment, packet header information is extracted from an IEEE 802.3 Ethernet header. The extracted information is combined with the known wireless connection (established between the converter 700 and an Access Point) parameters to form an IEEE 802.11 header. Methods for converting a wired Ethernet protocol to a wireless Ethernet protocol are well known to those skilled in the art and described in the respective IEEE 802 standards. Processing continues with block 814.

At block 814, the secure wired-to-wireless converter 700 encrypts the converted wireless network packet using encryption parameters established by WiFi Protected Access (WPA) and Wi-Fi Protected Access Second Edition (WPA2) process between the secure wired-to-wireless converter 700 and the AP. The PIN is used during a connection establishment phase to exchange encryption keys and authentication credentials. The encryption keys and authentication credentials are then stored in volatile memory in the secure wired-to-wireless converter 700 and used on a per-packet basis to encrypt the payload of the respective outgoing packet prior to transmitting over the secured wireless network. Methods for performing the encryption are discussed in standards such as WPA, WPA2, and Wi-Fi Protected Setup. Processing continues with block 816.

At block 816, the secure wired-to-wireless converter 700 transmits the converted encrypted packet to the AP. Thus, the secure wired-to-wireless converter 700 acts as a Layer 2 proxy on behalf of client device and AP respectively, realizing a secure Link-layer (L2 layer) connection between the client device and the wireless AP. Processing continues with block 806 to wait for another packet received by the secure wired-to-wireless converter.

At block 818, if a packet is received by the wireless network interface, processing continues with block 820.

At block 820, for each packet received by the wireless network interface, the secure wired-to-wireless converter 700 replaces the source MAC address of the packet, with the client MAC address which is stored in memory in the secure wired-to-wireless converter. Processing continues with block 822.

At block 822, for any higher layer protocol in the packet which includes the converter MAC address as a part of its header or payload, the secure wired-to-wireless converter 700 replaces the converter MAC address with the client MAC address. Processing continues with block 824.

At block 824, the secure wired-to-wireless converter 700 converts the Layer 2 packet header in the received packet from a wireless network protocol Layer 2 header, for example, IEEE 802.11 to a wired network protocol L2 header, for example, IEEE 802.3. Processing continues with block 826.

At block 826, the secure wired-to-wireless converter 700 decrypts the packet using the current encryption parameters established by WPA and WPA2 process between the secure wired-to-wireless converter 700 and the AP. As specified in WAP and WAP2, only the payload is encrypted, that is, the MAC addresses are not encrypted because they are needed to route the encrypted packet. Processing continues with block 828.

At block 828, the secure wired-to-wireless converter 700 transmits the packet through the wired interface to the client device. Processing continues with block 806 to wait for another packet to be received on via the wired network protocol interface or the wireless network protocol interface.

As discussed in conjunction with FIG. 1, a virtualized compute platform (system) 110 typically includes multiple processor components (compute cartridges 104a, 104b) sharing a commonly interconnected pool of disk storage (storage cartridges 106). Using virtualization, many disparate processes running different operating systems (OS) and applications can execute simultaneously on the platform within their own virtualized compute container, commonly called a virtual machine (VM). A Virtual Resource Manager (VRM) 404 discussed in conjunction with FIGS. 4-6 manages the VMs and the allocation of compute resources to the VMs.

The VRM 404 can perform load balancing by moving (or "migrating") the execution of a VM from one CPU 101 (on a first compute cartridge 104a, 104b) to another CPU 101 (on a second compute cartridge 104a, 104b) within the system 100. Load balancing is performed in order to efficiently spread the compute workload out over all CPUs 101 and thus maximize the overall compute utilization, while balancing factors such as memory, Input/Output and power.

Typically, a VRM 404 performs live migration, that is, migration of VMs occurs transparently to the execution of the VM, allowing migration to occur as the processes continue to run in the system 100. Live migration involves moving a process and its respective memory image between CPUs. In a system in which storage devices are accessible via a high bandwidth connection, the disk image is accessible from both compute cartridges 104a, 104b via a high bandwidth connection and therefore the disk image is not moved. For example, the high bandwidth connection can be provided over a high performance network based storage network, for example, NAS or Fibre Channel. The VM or user interacting with the VM is unaware that the VM execution has migrated from one CPU to another. Using live migration, VRMs can manage a system transparently and independently of VM execution.

However, the system shown in FIG. 1 does not include a high bandwidth network connection allowing a plurality of compute cartridges 104a, 104b to concurrently access a plurality of storage devices. In an embodiment, live migration is provided in a system in which each compute cartridge 104a, 104b is directly attached to one storage device, for example, using the Serial ATA (SATA) storage protocol.

Figure 9:
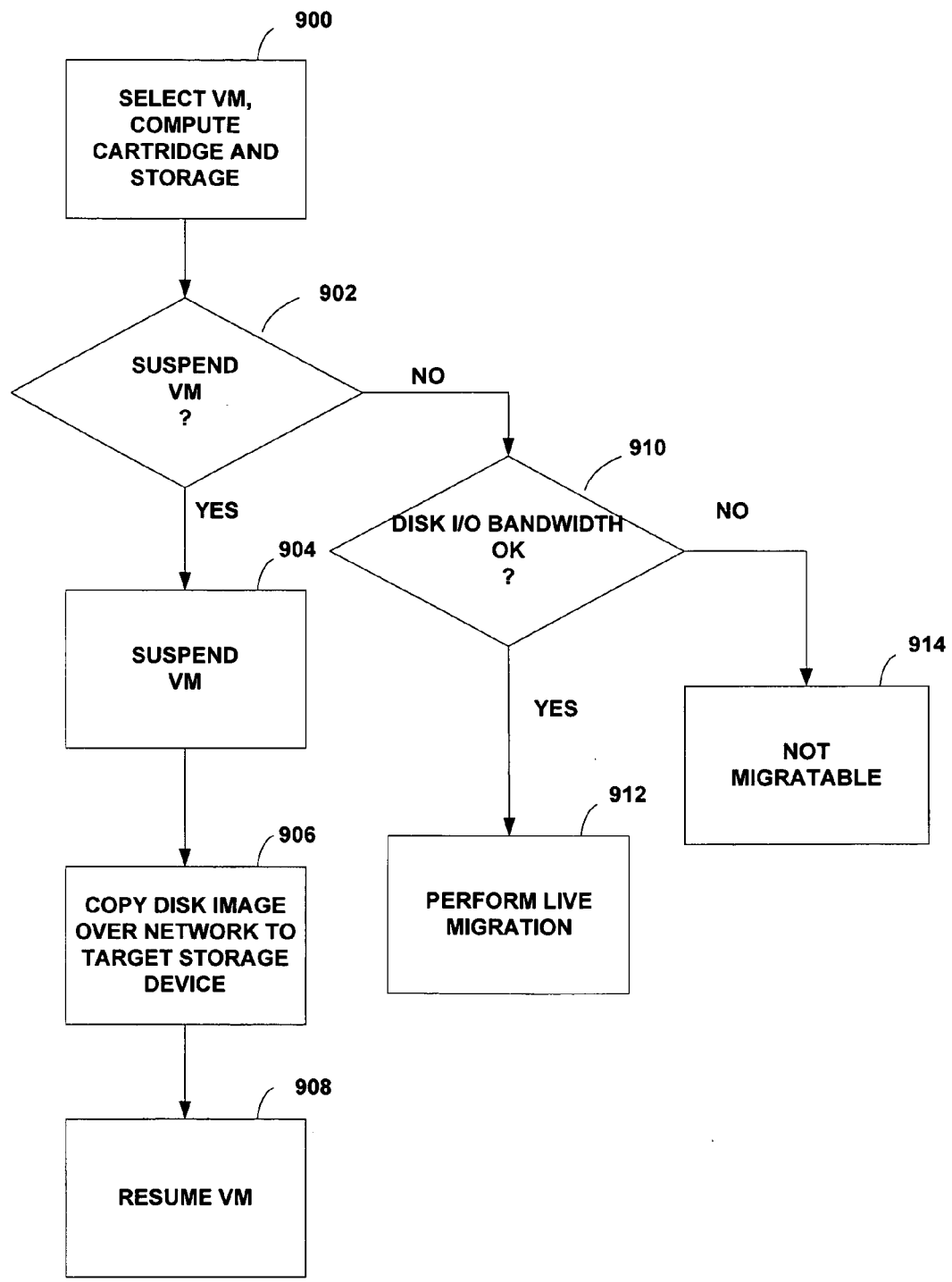
FIG. 9 is a flow graph illustrating a method for providing load-balancing within the system shown in FIG. 1.

FIG. 9 is a flow graph illustrating an embodiment of a method to provide load-balancing within the system 100 shown in FIG. 1.

The embodiment of a method for load balancing algorithm shown in FIG. 9 offers a large degree of flexibility and control for applications running in small business environments and in a home environment, without incurring the hardware costs associated with enterprise based virtual computing platforms. The load balancing is based on a combination of static VM relocation and live migration in order to realize virtual compute platforms that are significantly cheaper than traditional ones, by eliminating the need for expensive SAS switches, or NAS or SAN systems.

At block 900, a VM to be migrated, a target compute cartridge for migration and a storage device to which to move the VM image are selected. Processing continues with block 902.

At block 902, if the user specified VM policy allows the VM migration candidate to temporarily suspend its execution, for example, for a period of several minutes to one or two hours during some portion of the day, for example, during some off peak period, then the load balancer can suspend the VM. If the VM can be suspended, processing continues with block 904 to perform static VM migration. If not, processing continues with block 910 to perform active migration At block 904, the load balancer suspends the VM, which stops the VM in a re-startable state from where it left off. Processing continues with block 906.

At block 906, once suspended, the disk image associated with the VM is copied over the network to a portion of a target disk locally accessible to the target compute cartridge 104a, 104b. The disk image includes the Operating System, disk storage and data stored in memory in the compute cartridge 104a, 104b. Dependent on the size of the disk image, the copy operation can take from several minutes to a few hours. Processing continues with block 908.

At block 908, after the copy operation is complete, the VM can be unsuspended on the target compute cartridge 104a, 104b and the VM can continue execution from where it was suspended using the copied image of the VM that is locally accessible from the target compute cartridge 104a, 104b. The static VM migration (relocation) is complete.

At block 910, if the user specified VM policy does not allow the VM to be suspended, for example, for real-time processing responsibilities, or other reasons, then the load balancer can determine if the VM can be migrated via a traditional live migration procedure. If the VM can be characterized as having little disk I/O bandwidth, or its bandwidth combined with the overall empirical bandwidth falls below some acceptable maximum, then live migration can take place.

At block 912, live migration is performed.

At block 914, the disk image can not be migrated. Instead the disk image is accessed remotely using SATA over the communications network (for example, an Ethernet network) as the disk connectivity path. This may result in an increase in network traffic and can slow the execution of the VM or other VMs contending for the network. The VM is prohibited from migrating until operational conditions change.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. An apparatus comprising:
   a backplane including a plurality of slots;
   replaceable stateless storage cartridges; and
   at least two replaceable stateless compute cartridges, each compute cartridge comprising:
      an interface to a communications network, the compute cartridge remotely managed via the communications network; and
      memory to store a distributed manager, the distributed manager to dynamically maximize compute resource utilization over the plurality of compute cartridges;
   wherein the backplane includes a network switch and a serial storage protocol expander, the network switch to be used to provide secure and dedicated management communication between all of the compute cartridges, the serial storage protocol expander to allow any-to-any mapping of the compute cartridges to the storage cartridges;
   also wherein the plurality of slots includes at least two slots, each of the at least two slots including at least one respective system bus interface, serial storage protocol bus interface, control bus interface, and network interface.

2. The apparatus of claim 1, wherein each slot in the backplane is adapted to receive either the storage cartridge or the compute cartridge.

3. The apparatus of claim 1, wherein appliance services stored in a remote system are downloaded by the remote system to be stored in the memory for immediate use by the compute cartridge.

4. The apparatus of claim 1, wherein a virtual resource manager for a first compute cartridge is selected to be a master virtual resource manager and the other virtual resource manager for the other compute cartridge is selected to be a slave virtual resource manager, the master virtual resource manager to be responsible for global management of virtual machines.

5. The apparatus of claim 4, further comprising:
   a dedicated management network to be provided via the switch, the dedicated management network used by the plurality of virtual resource managers to communicate securely between the compute cartridges.

6. The apparatus of claim 4, wherein each slave virtual resource manager including a registration number, the registration number representing an order in which the slave virtual resource manager has registered with the master resource manager, each registration number associated with a different failover timeout period.

7. The apparatus of claim 6, wherein upon detecting a failure to receive a beacon from a master virtual resource manager after a timeout interval, the slave virtual resource manager having the lowest registration number to transparently transition to master virtual resource manager.

8. The apparatus of claim 4, wherein a resiliency software layer within the distributed manager automatically ensures that a manager virtual resource manager is operating.

9. The apparatus of claim 1, wherein the memory to store a distributed virtual manager configuration data structure that associates data on a storage device in a storage cartridge with a configuration.

10. A method comprising:
    dynamically maximizing compute resource utilization over at least two replaceable stateless compute cartridges installed in a respective slot of a backplane of a computer system, each compute cartridge including a memory to store a distributed manager;
    remotely managing the computer system, by a remote system via a communications network through an interface to the communications network in the compute cartridges;
    providing, via a network switch in the backplane, secure and dedicated management communication between all of the compute cartridges; and
    establishing, via a serial storage protocol expander in the backplane, a mapping of the compute cartridges to replaceable stateless storage cartridges comprised in the computer system, the serial storage protocol expander allowing any-to-any mapping of the compute cartridges to the storage cartridges;
    wherein the backplane includes at least two slots, each of the at least two slots including at least one respective system bus interface, serial storage protocol bus interface, control bus interface, and network interface.

11. The method of claim 10, wherein each slot in the backplane is adapted to receive either the storage cartridge or the compute cartridge.

12. The method of claim 10, further comprising:
    receiving appliance services stored in a remote system, the appliance services downloaded by the remote system to be stored in memory in the compute cartridge for immediate use by the compute cartridge.

13. The method of claim 12, further comprising:
    selecting a virtual resource manager for a first compute cartridge as a master virtual resource manager; and
    selecting the other virtual resource manager for the other compute cartridge as a slave virtual resource manager, the master virtual resource manager responsible for global management of virtual machines.

14. The method of claim 13, further comprising:
providing a dedicated management network, via the switch, between the compute cartridges to allow the plurality of virtual resource managers to communicate securely.

15. The method of claim 13, wherein each slave virtual resource manager includes a registration number, the registration number representing an order in which the slave virtual resource manager has registered with the master resource manager, each registration number associated with a different failover timeout period.

16. The method of claim 15, wherein upon detecting a failure to receive a beacon from a master virtual resource manager after a timeout interval, the slave virtual resource manager having the lowest registration number to transparently transition to master virtual resource manager.

17. The method of claim 13, wherein a resiliency software layer within the distributed manager automatically ensures that a manager virtual resource manager is operating.

18. The method of claim 10, wherein the memory to store a distributed virtual manager configuration data structure that associates data on a storage device in a storage cartridge with a configuration.

19. A system comprising:
a multi-user system, the multi-user system comprising replaceable stateless storage cartridges including a storage device, at least two replaceable stateless compute cartridges, a backplane including slots, and a wireless communications port;
a client system, the client system comprising a wired network port; and
a converter removeably coupled to the wired network port in the client system, the converter comprising:
a converter wireless interface to communicate via a wireless network using a wireless communications protocol;
a converter wired interface to communicate via a wired network using a wired communications protocol;
a non-volatile memory to store a unique identifier, the unique identifier stored in the non-volatile memory by a manufacturer and not configurable by a user, the unique identifier used to provide secure communication over the wireless network; and
a packet converter to perform packet conversion between the wireless communications protocol and the wired communications protocol, the converter wireless interface to automatically provide secure communication using the stored unique identifier to encrypt and decrypt all packets transferred over the wireless network between the client system and the multi-user system;
wherein the backplane includes a network switch and a serial storage protocol expander, the network switch to be used to provide secure and dedicated management communication between all of the compute cartridges, the serial storage protocol expander to allow any-to-any mapping of the compute cartridges to the storage cartridges;
also wherein the slots include at least two slots, each of the at least two slots including at least one respective system bus interface, serial storage protocol bus interface, control bus interface, and network interface.

20. The system of claim 19, wherein each slot in the backplane is adapted to receive either the storage cartridge or the compute cartridge.

21. The system of claim 19, wherein the packet converter adds authentication information to packets prior to sending packets over the wireless network.

22. The system of claim 21, wherein the packet converter verifies authenticity of packets received over the wireless network prior to sending the packets over the wired network.

* * * * *